United States Patent [19]

Kanner

[11] 4,039,490

[45] Aug. 2, 1977

[54] HIGH RESILIENCE FOAM

[75] Inventor: Bernard Kanner, West Nyack, N.Y.

[73] Assignee: Union Carbide Corporation, New York, N.Y.

[21] Appl. No.: 644,805

[22] Filed: Dec. 29, 1975

[51] Int. Cl.² ................................................ C08J 9/00
[52] U.S. Cl. ...................... 260/2.5 AH; 260/2.5 AC; 260/2.5 AP
[58] Field of Search .................. 260/2.5 AH, 448.2 B

[56] References Cited

U.S. PATENT DOCUMENTS

| 3,741,917 | 6/1973 | Morehouse | 260/2.5 AH |
| 3,793,300 | 2/1974 | Prokai et al. | 260/2.5 AH |
| 3,839,384 | 10/1974 | Morehouse | 260/2.5 AH X |
| 3,842,112 | 10/1974 | Omietanski et al. | 260/448.2 B |
| 3,879,433 | 4/1975 | Omietanski et al. | 260/448.2 B |
| 3,905,924 | 9/1975 | Prokai | 260/2.5 AH |

Primary Examiner—Lewis T. Jacobs
Attorney, Agent, or Firm—Reynold J. Finnegan

[57] ABSTRACT

A process for producing high resilience polyether urethane foam using tertiary alcohol modified siloxane surfactants.

19 Claims, No Drawings

HIGH RESILIENCE FOAM

BACKGROUND OF THE INVENTION

The present invention relates to the formation of high resilience polyurethane foam.

It is well known to the art that urethane polymers are provided by the reaction of organic polyisocyanates and active hydrogen-containing organic compounds such as, for example, polyether polyols. It is also well known that the reaction is usually effected in the presence of one or more activators and that blowing action is provided when cellular products are desired. In producing conventional flexible polyether urethane foam, the rate of reaction and heat generated by the exothermic reaction between the polyisocyanate and polyether polyol is sufficient to cure the center of the foam product but the surface temperature usually does not rise high enough to cure the outside rapidly. Consequently, extended high temperature post cure treatment is necessary in commercial practice to provide a foamed product of satisfactory overall properties.

A relatively recent advance in polyurethane foam technology is the advent of reaction mixtures having a sufficiently high reactivity to provide faster and more complete reactions during polymer formation and expansion. As a result, overall processing time including high temperature post curing, if any, is substantially reduced. Basically, the more highly exothermic nature of such reaction mixture is provided by the employment of polyether polyols having a high content of primary hydroxyl groups. Such foams are especially desirable for cushioning applications in view of their excellent physical properties. Among these properties are reduced combustibility relative to conventional polyether foam, low flex fatigue which means long life as a cushioning material, and high resilience which is usually from about 55 to about 70 percent, as measured by standard test procedure ASTM D-1564-69. In view of this latter characteristic, such foams are commonly referred to as "high resilience" foam, and previously as "cold cure" foam.

Because of the rapid buildup of gel strength of high resilience foam systems, the foam can sometimes be provided without a surfactant. Typically, however, high resilience foams produced without a surfactant or stabilizer have very irregular cell structure. It is usually desirable, therefore, to include a silicone surfactant as an additional component of high resilience foam formulations in order to control cell uniformity and to minimize the tendency of the foam to settle. In general surfactants required for stabilization of conventional flexible polyether foam are unsatisfactory for high resilience foam because they overstabilize, causing extremely tight foam and excessive shrinkage. If the problem is sought to be corrected by reducing the concentration of such surfactants to a level which eliminates shrinkage, the cells are no longer stabilized satisfactorily and the foam structure becomes irregular and coarse.

It is known that specific low viscosity unmodified dimethylsilicone oils having a narrow low molecular weight distribution are useful stabilizers for high resilience foam, but in general have various disadvantages. For example, the very low use levels at which they give the best foam properties, about 0.05 to 0.10 parts per 100 parts of polyol, create metering the pumping problems, while relatively high concentrations of these oils adversely affect the physical properties of the foam. Moreover, solvents for such oils that are non-reactive with the foam ingredients, e.g. alkanes, hexamethyldisiloxane, and the like, adversely affect the foam's physical properties in proportion to their concentration and generally create flammability hazards, while isocyanate reactive diluents, such as polyether triols, and the like, which do not significantly change the foam's properties, inasmuch as they become part of the foam structure, are not satisfactory solvents for dimethylsilicone oils, thus in general not enough oil can be dissolved to provide foam stabilization at practical solution concentrations. Further, high resilience foam systems are adversely affected by dimethylsilicones having more than about ten dimethylsiloxy units per chains. For example, only five or ten weight percent of such species in a dimethyl oil appreciably degrade foam physical properties and even cause foam shrinkage.

Among other more successful classes of surfactants for high resilience foam are: (1) the relatively low molecular weight polysiloxane-polyoxyalkylene copolymers described in U.S. Pat. No. 3,741,917; (2) the particular class of aralkyl-modified siloxanes described in U.S. Pat. No. 3,839,384; (3) the cyanoalkyland cyanoalkoxy-modified siloxanes described in U.S. Pat. No. 3,905,924; and (4) the cyanoalkoxyalkyland cyanoalkoxyalkoxy-modified siloxanes described in Belgium Pat. No. 809,979.

It is a principal object of this invention to provide a process for preparing high resilience polyether polyurethane foam employing tertiary alcohol modified siloxane surfactants. Various other objects and advantages of this invention will become readily apparent to those skilled in the art from the accompanying description and disclosure.

SUMMARY OF THE INVENTION

More specifically the instant invention is directed to process for preparing high resilience polyether polyurethane foam, said process comprising reacting and foaming a reaction mixture comprising: (a) an organic polyether polyol having an average primary hydroxyl content of at least 35 mole percent and an average hydroxyl functionality from 2.1 to about 5; (b) an organic polyisocyanate reactant containing at least two isocyanate groups per molecule; (c) a blowing agent, (d) a tertiary-amine catalyst; and (e) a tertiary alcohol-modified siloxane polymer surfactant.

In their utilization for forming high resilience foam, the tertiary alcohol-modified siloxane surfactants can be introduced to the foam producing reaction mixtures either as such, as a solution in a variety of organic liquids, in combination with various organic additives including organic surfactants, or in combination with one or more of the urethane-forming reactants, blowing agent or amine catalyst.

DESCRIPTION OF THE PREFERRED EMBODIMENTS

The tertiary alcohol modified siloxane polymers employed as the siloxane polymer surfactant stabilizers in this invention are siloxanes consisting essentially of: (1) monofunctional end-blocking siloxy units, the respective silicon atoms of which have two alkyl radicals bonded thereto, the third silicon-bonded organic group being a tertiary alcohol radical (X) or an alkyl radical; (2) an average of from about 1 to about 6 moles of dialkylsiloxy units for every two moles of said monofunctional siloxy units; and (3) from zero up to an average of about 6 moles, for every two moles of said monofunctional siloxy units, of difunctional monoalkylsiloxy units in which the second organic group bonded to silicon is a tertiary alcohol radical (X), provided an average of at least about 0.5 moles of said tertiary alcohol groups are present in said tertiary alcohol-modified siloxanes for every two moles of said monofunctional siloxy units.

As indicated the essential silicon-bonded tertiary alcohol groups of the siloxanes of the present invention are collectively referred to herein by the symbol X and include any of the monovalent radical encompassed by the formula

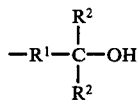

wherein $R^1$ is a bivalent hydrocarbon radical selected from the class consisting of alkylene radicals having from 2 to 8 carbon atoms and alkenylene radicals having from 2 to 8 carbon atoms; and $R^2$ represents a lower alkyl radical having from 1 to 4 carbon atoms, especially methyl. Of course, it is to be understood that each $R^2$ may be the same or different and that the bridging group represented by $R^1$ includes linear and branched radicals and that $R^1$ is bonded directly through one of its carbon atoms to the silicon atom of the appropriate siloxy unit of the polymer to give a Si-C bond, the other valence of $R^1$ being satisfied by a carbon to carbon bond to the tertiary carbon atom of the $-C(R^2)-OH$ group. Illustrative of such $R^1$ radicals are $-CH_2CH_2-$, $-CH_2CH_2CH_2-$, $-CH_2-C(CH_3)H-$, $-CH_2CH_2CH_2CH_2-$, $-C_8H_{16}-$(1,8-octylene) $-CH=CH-$,

$-CH=CH-CH_2-$, $-CH=CHC_6H_{12}-$ and the like. Preferably each $R^2$ radical is methyl and $R^1$ contains two carbon atoms, especially $-CH_2CH_2-$.

Thus, the monofunctional siloxy units can be represented by the unit formula $R_3SiO_{1/2}$ and $R_2(X)SiO_{1/2}$; the dialkylsiloxy units by the unit formula $R_2SiO_{2/2}$; and the difunctional monoalkylsiloxy units by the unit formula $R(X)SiO_{2/2}$, wherein R is a lower alkyl radical having from 1 to 4 carbon atoms and X is a tertiary alcohol group as defined above. Of course, it is understood that in any given siloxane polymer the respective siloxy units may be the same as or different from one another and the polymer can contain any combination or subcombination of the respective siloxy units provided that the average composition contains at least about 0.5 moles of the tertiary alcohol group X and from about 1 to about 6 moles of said dialkylsiloxy unit for every two moles of said monofunctional end-blocking siloxy unit.

Consistent with the above description and, from the standpoint of the nature and relative proportion of monomeric siloxy units, the tertiary alcohol-modified siloxane surfactants employed in the present invention have the following average composition, as expressed on the normalized basis of a total of two moles of monofunctional units, that is, per average mole of polymer:

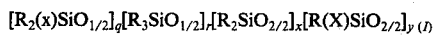

wherein:
X is silicon-bonded tertiary alcohol group

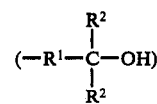

as previously defined;
R is alkyl of one to four carbon atoms;
$q$ is zero or any positive number having an average value of no more than two, $r$ is zero or any positive number having an average value of no more than two, and the average value of the sum $q+r$ is two;
$x$ has an average value from about 1 to about 6; and
$y$ is zero or any positive number having an average value of no more than about 6, provided the average value of the sum $q+y$ is at least about 0.5.

It is evident, therefore, that the sum $q+y$ corresponds to the total number of X groups contained in an average mole of polymer and that when either $q$ or $y$ is zero, the other must be at least 0.5. It is also evident that when both $q$ and $r$ are positive numbers, the polysiloxanes of the invention contain both types of the respective monofunctional units.

Of course, it is to be understood that the reoccurring difunctional units of Formula (I) above may be distributed in the siloxane randomly, alternately, as subblocks of repeating units of the same type, or in any combination of such arrangements. Further, although the siloxane polymers of the invention can be discrete chemical compounds, they are usually mixtures of discrete siloxane species which differ in molecular weight and in the type, arrangement and relative proportions of units. Therefore, as expressed herein, the parameters, employed to denote the relative proportions of units (e.g., $x$ and $y$) are average values and are based on the relative proportions of reactants from which the respective units are derived. It is to be further understood that, consistent with convention in the art to which the present invention pertains, as expressed herein, the formula of the siloxane polymers indicate their overall average empirical composition rather than any particular ordered arrangement of units or molecular weight of any particular discrete siloxane species. With this understanding, the average composition of the respective types of tertiary alcohol-modified siloxanes encompassed by Formula I above may be expressed by the following formulae wherein the various siloxy units are shown in chemically combined form:

| | |
|---|---|
| $R_3SiO[R_2SiO]_x[R(X)SiO]_ySiR_3$ | (II) |
| $R_2(X)SiO[R_2SiO]_x[R(X)SiO]_ySiR_2(X)$ | (III) |
| $[R_2(X)SiO]_q[R_2SiO]_x[R(X)SiO]_y[SiR_3]_r$ | (IV) | wherein the average value of $x$ ranges from about 1 to about 6, preferably about 1 to 4; the average value pf $y$ ranges from 0 to about 6, preferably about 1 to about 3; the average vakue of $q$ and $r$ being positive numbers the sum of which is two, provided the total average number of tertiary alcohol or X groups is at least about 0.5. It is evident, therefore, that: (1) in Formula II, the average value of $y$ is at least about 0.5 and no more than 6; (2) in Formula III, $y$ can be zero or any positive number up to 6; and (3) in Formula IV the average value of $q+y$ is at least about 0.5 the maximum value of $y$ being 6. For example, in Formula IV, when $q$ is 0.5 (and thus $r$ is 1.5) $y$ may be zero, 0.1, 0.5, 0.8, 1.2, 1.5 and so forth up to a maximum value of 6. Further regard to Formula IV, it is also evident that when $q$ has a value of less than 0.5 such as 0.25, the polymer must contain difunctional (methyl) tertiary alcohol modified siloxy units and the corresponding minimum average value of $y$ is 0.25.

The silicon-bonded R groups are alkyl radicals having from one to four carbons atoms including linear and branched alkyls. Illustrative of suitable groups encompassed by R are: methyl, ethyl, n-propyl, isopropyl, n-butyl and t-butyl. Of these, methyl is preferred. It is to be understood that the R groups may be the same throughout the siloxanes described herein or they may differ as between or within units without departing from the scope of this invention. For example, when the endblocking monofunctional units are M, that is, $(R)_3SiO_{1/2}—$, they may be trimethylsiloxy units and the difunctional units, $R_2SiO_{2/2}$ may be diethylsiloxy and/or methylethylsiloxy units.

In the X substituents of the siloxanes of this invention, that is, in

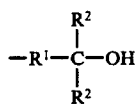

$R^1$ and $R^2$ are the same as defined above.

Illustrative siloxy units $[R(X)SiO_{2/2}]$ of the tertiary alcohol-modified siloxanes described herein are the following:

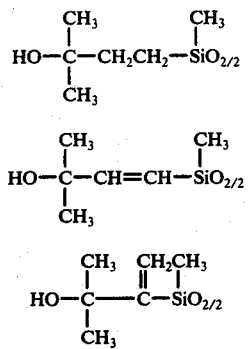

and corresponding units in which the silicon-bonded methyl group is ethyl, propyl, butyl, and the like. It is to be understood that the siloxanes of this invention may contain any one of the various above illustrated units as essentially the sole type of X-substituted difunctional unit or the siloxanes may be comprised of any combination thereof.

Ilustrative of the X-substituted monofunctional endblocking units $[R_2(X)SiO_{1/2}]$ are corresponding tertiary alcohol dialkylsiloxy units such as

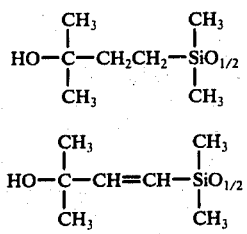

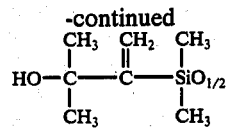

and the like.

The generally preferred tertiary alcohol-modified siloxanes employed herein are the compositions defined by above Formulas I–IV in which R is methyl and, in the X group, each $R^2$ is methyl and the bivalent hydrocarbon group $R^1$ is an alkylene or alkenylene radical having from 2 to 8 carbon atoms. Illustrative of the most preferred siloxane surfactants are those within the scope of Formula II, as more specifically defined by the following formula II-A:

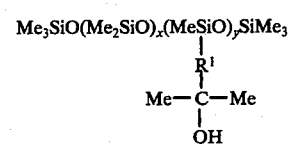

wherein Me is methyl ($—CH_3$); $x$ has an average value of from about 1 to about 6, preferably about 1 to about 4; $y$ has an average value of from about 0.5 to about 6, preferably about 1 to about 3; and $R^1$ is a bivalent hydrocarbon radical selected from the class consisting of bivalent alkylene radical having from 2 to 8 carbon atoms, especially $—CH_2CH_2—$, and bivalent alkenylene radicals having from 2 to 8 carbon atoms, especially $—CH=CH—$ and

the preferred bivalent hydrocarbon radical being bivalent alkylene, especially $—CH_2CH_2—$.

The tertiary alcohol-modified siloxanes employed in this invention and/or method for their preparation are well known in the art, as witnessed by U.S. Pat. Nos. 3,842,112 and 3.879,433, the disclosure of which are incorporated herein by reference thereto. For example the tertiary alcohol-modified siloxanes can be prepared by conventional hydrosilation, i.e. reacting the corresponding alkenyl or acetylenic end-blocked tertiary alcohols with the corresponding unmodified hydrosiloxanes of the tertiary alcohol-modified siloxane product desired in the presence of a catalyst for the addition of SiH to olefinic bonds. Typical of the alkenyl and acetylenic tertiary alcohols that are useful in producing the tertiary alcohol modified siloxanes used in this invention are those alchols disclosed in U.S. Pat. Nos. 3,842,112 and 3,879,433, e.g. 3-hydroxy-3-methyl-1-butene, $[H_2C=CHC(CH_3)_2OH]$, 3-hydroxy-3-methyl-1-pentene, $[H_2C=CHC(CH_3)(C_2H_5)OH]$, 3-hydroxy-3-methyl-1-butyne $[HC\equiv C—C(CH_3)_2OH]$, and the like. The corresponding unmodified hydrosiloxane reactants, i.e. siloxanes corresponding to thosse of Formula I above wherein X is hydrogen instead of a teritary alcohol group used to produce the tertiary alcohol-modified siloxanes employed in this invention and/or methods for their preparation are also well known as seen by said U.S. Pat. Nos. 3,842,112 and 3,879,433. For instance, such unmodified hydrosiloxanes can be produced by cohydrolyzing and cocondensing the appropriate hydrolyzable silanes or by equilibrating appropriate siloxanes using conventional techniques.

The above described tertiary alcohol-modified siloxanes have been found to stabilize high resilience polyether urethane foam against voids without causing severe shrinkage problems and have good potency thereby furnishing a wide processing latitude. In their use as foam stabilizing components of high resilience foam formulations, the other essential types of components and reactants are an organic polyol reactant comprising a polyether polyol having a primary hydroxyl content of at least about 35 mole percent, an organic polyisocyanate, an amine catalyst and a blowing agent. The tertiary alcohol-modified siloxanes employed herein are present in the high resilience foam formulation in an amount between about 0.03 and about 3 parts by weight per one hundred parts by weight of total polyol reactant (p.p.h.p.). Usually the concentration is from about 0.05 to about two p.p.h.p.

The polyether polyol of which the organic polyol reactant is comprised has an average of from 2.1 to about 5 hydroxyl groups per molecule and an average primary hydroxyl content at least about 35 based on the total moles of hydroxyl groups in the polyol. For convenience, this class of polyols are referred to herein as Polyol I. This class of polyether polyols are typically derived from propylene oxide and ethylene oxide and an organic initiator or mixture of initiators of the alkylene oxide polymerization. The average number of hydroxyl groups in the polyols encompassed by Polyol I is achieved by control of the functionality of the initiator or mixture of initiators used in producing the polyol. The high primary hydroxyl content is provided by capping of the polyoxyalkylene chains with at least a portion of the total ethylene oxide feed. Both the oxyalkylation and capping reactions are preferably effected in the presence of a basic material such as, for example, potassium hydroxide. The hydroxyl numbers of this class of polyether polyols may be from 84 to 18 and are usually no more than about 45. As is well known, the hydroxyl number of a polyol is the number of milligrams of potassium hydroxide required for the complete hydrolysis of the fully acylated derivative prepared from 1 gram of polyol. The hydroxyl number is also defined by the following equation which reflects its relationship with the functionality and molecular weight of the polyol reactant:

$$\text{OH No.} = \frac{56.1 \times 1000 \times f}{M.W.}$$

where:
OH = hydroxyl number of the polyol;
f = average functionality, that is, average number of hydroxyl groups per molecule of polyol; and
M. W. = average molecular weight of the polyol.

In the polyols within the scope of Polyol I, the polyoxyalkylene chains may consist essentially of polyoxypropylene capped with oxyethylene or they may be constituted of polyoxypropylene and polyoxyethylene, provided the chains are endblocked by oxyethylene. When the polymerization is effected employing propylene and ethylene oxides, the respective alkylene oxides may be fed sequentially to provide sub-blocks of repeating units of the same type or they may be fed in admixture to provide a random distribution of units. The chains may also contain oxybutylene units provided such chains are also capped with oxyethylene. The terminal polyoxyethylene caps which endblocks the polyoxyalkylene chains provide essentially only primary hydroxyl groups which in turn provide a more highly reactive polyether polyol for producing high resilience foam than polyols having terminal oxypropylene groups. The latter provide essentially only secondary hydroxyl groups (e.g., a ratio of secondary to primary hydroxyls of about 97 to 3), Within the class of polyols defined by Polyol I, the generally preferred compositions are those having at least about 50 mole percent of primary hydroxyl groups based on the total moles of hydroxyl groups contained in the polyol. Usually the polyols have a primary hydroxyl content of no more than about 85 mole percent. The preferred hydroxyl functionality is at least 2.4. Most preferably, the minimum average number of hydroxyl groups per molecule is from about 2.8 to 3.2, and the maximum average hydroxyl functionality is about 4.8. The most preferred polyols are the polyether triols having a molecular weight from about 2000 to 8000, and especially those containing about 60 to 90 mole percent of primary hydroxy groups and having a molecular weight of about 4,000 to about 7000, as disclosed in U.S. Pat. No. 3,839,384.

The average number of hydroxyl groups (i.e., functionality) in the polyether polyols encompassed by Polyol I is achieved by control of the functionality of the starter or mixture of starters used in producing the polyol. Thus, suitable starters or initiators of the alkylene oxide polymerization comprise compounds having an active hydrogen functionality (as hydroxyl or amino hydrogen) from about 3 to 5, appropriate mixtures of such initiators with one another and/or with starters having an active hydrogen functionality outside of this range such as diols, hexols and the like. When a mixture of starters is used, the individual starters may be used in any relative proportions provided the average hydroxyl functionality of the polyether polyol produced therefrom is from 2.1 to about 5.

Suitable starters of the alkylene oxide polymerization include polyhydric compounds and primary and secondary polyamines having from three to five active hydrogen atoms (as —OH or —NH) and up to 15 carbon atoms. Illustrative of such starters are any of the following which may be employed individually or in combination with one another: glycerol; 1,2,6-hexanetriol; 1,1,1-trimethylolethane; 1,1,1-trimethylolpropane; 3-(2-hydroxyethoxy)- and 3-(2-hydroxypropoxy)-1,2-propanediols; 2,4-dimethyl-2-(2-hydroxyethoxy) methyl-pentanediol-1,5; 1,1,1-tris[(2-hydroxyethoxy)methyl]ethane; 1,1,1-tris[(2-hydroxypropoxy)methyl]propane; erythritol; pentaerythritol; ethylenediamine; and diethylenetriamine. As is evident, the employment of one or more of such triols, tetraols and polyamines as the initiator of alkylene oxide polymerization provides polyether polyols having an average hydroxyl functionality from 3 to 5.

Polyether polyols within the scope of Polyol I including those having an average of 2.1 hydroxyl groups per molecule, may also be prepared by the employment of any of the above initiators in combination with initiators having an active hydrogen functionality as low as two and more than five such as one or more of the following: ethylene glycol; diethylene glycol; propylene glycol; dipropylene glycol; 1,5-pentanediol; hexylene glycol; sucrose; sorbitol; methylglycoside; and the like.

In the high resilience foam-producing reaction mixture described herein, the above-described polyether polyols referred to as Polyol I may be used as essentially the sole type of polyether polyol reactant or they may be employed in combination with other polyols to control the degree of softness or firmness of the foam and to vary the load-bearing properties. For example, when softer grade high-resilience foams are desired, Polyol I may be used in combination with polyether diols such as alkylene oxide adducts of a dihydric starter such as propylene and dipropylene glycols. When employed as mixtures with other polyethers having an average of at least two hydroxyl groups, Polyol I of said mixtures should amount to at least about 40 (preferably at least about 50) weight percent of the total polyol content. Of course, preferred mixtures are those incompassing the above defined preferred polyether triols and other polyols as disclosed in U.S. Pat. No. 3,839,384. When firm grades of high resilience foams having enhanced load-bearing properties are desired, the organic polyol reactant of the foam formulation preferably comprises a polymer/polyether polyol in addition to Polyol I. The polymer/polyols are produced by the in situ polymerization of at least one ethylenically unsaturated monomer in a polyether polyol. For convenience, the polymer/polyols are referred to herein as Polyol II. Such polyols have hydroxyl numbers from about 18 to about 65. In the preferred high resilience formulations employed in the practice of the present invention, the organic polyol reactant is constituted of from about 40 to about 80 weight percent of those polyether polyols encompassed by Polyol I and correspondingly from about 60 to about 20 weight percent of the polymer/polyols encompassed by Polyol II. Usually, the high resilience formulation contains no more than about 50 weight percent of polymer/polyol based on the weight of total polyol reactant contained in the formulation.

In forming the polymer/polyols, one or more ethylenically unsaturated monomers is dissolved or dispersed in a polyether polyol and the polymerization is effected in the presence of a free radical catalyst. Especially suitable substrate polyols for producing such compositions are those polyether polyols encompassed by the definition of Polyol I. Also useful but less preferred as the substrate polyol are conventional polyether polyols outside the scope of Polyol I, that is polyether polyols not having the high primary hydroxyl content of Polyol I. Such additional substrate polyols may have average hydroxyl functionalities from 2 to 5 and hydroxyl numbers from about 20 to about 125, and are produced by initiating the alkylene oxide polymerization (preferably propylene oxide, ethylene oxide and combinations thereof) with any initiator having an active hydrogen functionality of at least two. Illustrative of the ethylenically unsaturated monomers are vinyl compounds having the general formula,

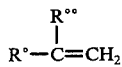

wherein: R° is hydrogen, methyl or any of the halogens (i.e., fluorine, chlorine, bromine or iodine); and R°° is R°, cyano, phenyl, methyl-substituted phenyl, carboalkoxy, or alkenyl radicals having from 2 to 6 carbon atoms such as vinyl, allyl and isopropenyl groups. Typical examples of such polymerizable monomers are the following which may be employed individually or in combination: ethylene, propylene, acrylonitrile, methacrylonitrile, vinyl chloride, vinylidene chloride, styrene, alphamethylstyrene, methyl methacrylate, and butadiene. In general, such compositions are prepared by polymerizing the monomers in the substrate polyol at a temperature between about 40° C. and about 150° C. employing any free radical-generating initiator including peroxides, persulfates, percarbonates, perborates and azo compounds. Illustrative of suitable initiators are: hydrogen peroxide, dibenzoyl peroxide, benzoyl hydroperoxide, lauroyl peroxide and azobis(isobutyronitrile).

The polymer/polyol compositions generally contain from about 3 to about 50, and more usually no more than about 40, weight percent of the vinyl monomer or monomers polymerized in the substrate polyether polyol. Especially effective polymer/polyols encompassed by Polyol II are those having the following composition:

A. from about 10 to about 30 weight percent of a copolymer of (1) acrylonitrile or methacrylonitrile, and (2) styrene or alpha-methylstyrene, the said copolymer containing from about 40 to 85 and from about 60 to 15 weight percent of monomeric units of (1) and (2), respectively; and B. from about 90 to about 70 weight percent of one or more of the aforementioned types of substrate polyether polyols of which the polyols encompassed by Polyol I are especially preferred.

The isocyanate reactant of the high resilience foam formulations employed in the practice of the present invention may be any of the polyisocyanates known to the art of cellular polyurethane formation such as disclosed in U.S. Pat. No. 3,839,384. Generally useful are organic polyisocyanates having an —NCO functionality of at least two and include aliphatic and aromatic polyisocyanates which are discrete chemical compounds, polyfunctional isocyanates produced as residue products in the manufacture of such compounds or polymeric aryl isocyanates, including any combination thereof. Among such suitable polyisocyanates are those represented by the general formula:

wherein: $i$ has an average value of at least two and is usually no more than six, and Q' represents an aliphatic, cycloaliphatic or aromatic radical which can be an unsubstituted hydrocarbyl group or a hydrocarbyl group substituted, for example, with halogen or alkoxy. For example, Q' can be an alkylene, cycloalkylene, arylene, alkyl-substituted cycloalkylene, alkarylene or aralkylene radical including corresponding halogen- and alkoxy-substituted radicals. Typical examples of such polyisocyanates for use in preparing high resilience polyurethane foam as described herein are any of the following including mixtures thereof: 1,6-hexamethylenediisocyanate; 1,4-tetramethylenediisocyanate; bis(2-isocyanatoethyl)fumarate; 1-methyl-2,4-diisocyanatocyclohexane; methylene-4,4'-diphenyldiisocyanate, commonly referred to as "MDI"; phenylene diisocyanates such as 4-methoxy-1,4-phenylenediisocyanate, 4-chloro-1,3-phenylenediisocyanate, 4-bromo-1,3-phenylenediisocyanate, 5,6-dimethyl-1,3-phenylenediisocyanate and 6-isopropyl-1,3-phenylenediisocyanate; 2,4-tolylene diisocyanate and 2,6-tolylene diisocyanate including mixtures of these two isomers as well as crude tolylene diisocyanate; isophoronediisocyanate; methylene-4,4'-dicyclohexyldiisocyanate; durylene diisocyanate; triphenylmethane-4,4',4'''-triisocyanate; and other organic polyisocyanates known to the polyurethane art. Of the aforesaid types of polyisocyanates, those containing aromatic nuclei are generally preferred.

Also useful as the polyisocyanate reactant are polymeric aryl isocyanates having units of the formula:

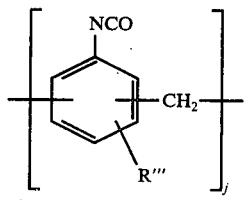

wherein R''' is hydrogen and/or lower alkyl (e.g., methyl), and $j$ has an average value of at least 2.1. Usually, R''' is hydrogen and $j$ has an average value no higher than about 4. Particularly useful polymeric aryl isocyanates of this type are the polyphenylmethylene polyisocyanates produced by phosgenation of the polyamine obtained by acid-catalyzed condensation of aniline with formaldehyde. They are low viscosity (50–500 centipoise at 25° C.) liquids having average isocyanato functionalities in the range of about 2.25 to about 3.2 or higher, and free —NCO contents of from about 25 to about 35 weight percent, depending upon the specific aniline-to-formaldehyde molar ratio used in the polyamine preparation. Suitable polymeric isocyanates of this type for use in the practice of this invention are those available commercially as PAPI 901 (The Upjohn Company) and NIAX Isocyanate AFPI (Union Carbide Corporation).

Also useful as polyisocyanate reactants are tolylene diisocyanate residues obtained from the manufacture of the 2,4- and 2,6- isomers of tolylene diisocyanates, and having a free —NCO content of from about 30 to about 50 weight percent. For example, as is known, tolylene diisocyanate is commercially made by reacting toluene and nitric acid to form the 2,4- and 2,6-dinitrotoluene isomers, hydrogenating and then phosgenating, typically in a solvent such as dichlorobenzene, to provide the conventional mixture of 80 percent 2,4-tolylene diisocyanate and 20 percent 2,6-tolylene diisocyanate. After removal of the solvent, the crude product undergoes a further evaporation in a still, with the refined or pure tolylene diisocyanate coming over. The evaporator tails remaining are black in color and extremely viscous, even often solid, materials. It is the evaporator tail material which is commonly referred to as tolylene diisocyanate residue.

Other useful polyisocyanate reactants are "liquid MDI," and combinations of diisocyanates with polymeric isocyanates having an average of more than two isocyanate groups per molecule. Illustrative of such combinations are: a mixture of 2,4-tolylene diisocyanate, 2,6-tolylene diisocyanate and the aforesaid polyphenylmethylene polyisocyanates and/or the aforementioned tolylene diisocyanate residue product.

Especially useful as the polyisocyanate reactant of the high resilience foam formulations described herein are combinations of isomeric tolylene diisocyanates and the above-described polymeric aryl isocyanates. Employed with particular advantage are mixtures containing from about 60 to about 90 weight percent of the isomeric tolylene diisocyanates and from about 40 to about 10 weight percent of the polyphenylmethylene polyisocyanates, in order to enhance the average —NCO functionality and thus the reactivity of the reaction mixture. When the high resilience formulations contain the isomeric diisocyanates as essentially the sole source of reactive —NCO, it is often desirable to include minor amounts of cross-linking agents, such as up to about 1.5 parts by weight per one hundred parts of polyol reactant.

On a combined basis, the polyol reactant and organic polyisocyanate usually constitute the major proportion by weight of the polyurethane-forming reaction mixture. In general, the polyisocyanate and polyol reactants are employed in relative amounts such that the ratio of total —NCO equivalents to total active hydrogen equivalent (of the polyol and water present as a blowing agent) is from 0.8 to 1.5, usually from 0.9 to 1.35, equivalents of —NCO per equivalent of active hydrogen. This ratio is known as the Isocyanate Index and is often also expressed as a percent of the stoichiometric amount of polyisocyanate required to react with total active hydrogen. When expressed as a percent, the Isocyanate Index may be from 80 to 150, and is usually within the range from about 90 to about 135. More usually, the Isocyanate Index is no more than bout 115.

The high resilience foam-forming reaction is effected in the presence of a catalytically effective amount of a catalyst comprising an amine which is usually a tertiary-amine such as disclosed in U.S. Pat. No. 3,839,384. Among the suitable classes of suitable amine catalysts are those consisting of carbon, hydrogen and amino nitrogen. Illustrative of such suitable hydrocarbyl amine catalysts are the following mono- and polyamines: trimethylamine; tributylamine; triethylamine; N, N-dimethylcyclohexylamine; N, N-dimethylbenzylamine; triethylenediamine; N, N, N', N'-tetramethylethylenediamine; N, N, N', N'-tetraethylenediamine; N, N, N', N'-tetramethyl-1,3-butanediamine; and 1,1.4,7,7-pentamethyldiethylenetriamine.

Another class of suitable tertiary-amines which may be present in the catalyst systems of the present invention are the beta-amino carbonyl compounds described in U.S. Pat. No. 3,821,131 such as, in particular, the 3-dialkylamino-N,N-dimethylpropionamides. Of this class, 3-dimethylamino-N,N-dimethylpropionamide is a particularly effective component of the catalyst system of high resilience foam formulations.

A third class of suitable tertiary-amine catalysts are bis[2-(N,N-dimethylamino)alkyl]ethers such as, in particular, bis[2-(N,N-dimethylamino)ethyl]ether. Also useful is distilled residue product formed in the manufacture of the latter compound by the method of U.S. Pat. No. 3,957,875.

Other classes of tertiary-amines which are suitably employed as catalysts of the high resilience formulations described herein are: N,N-dialkylalkanolamines such as, in particular, N,N-dimethylethanolamine; the betaaminopropionitriles described in U.S. Pat. No. 3,925,268 such as, in particular, 3-dimethylaminopropionitrile; and saturated heterocyclic tertiary-amines such as N-methylmorpholine, N-ethylmorpholine, 1,4-dimethylpiperazine and N-(2-hydroxyethyl)piperazine.

It is to be understood that the amine catalyst system of the high resilience foam formulation may comprise a combination of any of the above tertiary-amines such as a combination of the aforementioned triethylenediamine, bis[2-(N,N-dimethylamino)ethyl]ether and 3-dimethylamino-N,N-dimethylpropionamide. The amine catalyst is present in the final urethane-producing reaction mixture in a catalytically effective amount. Generally, the concentration of total amine is within the range from about 0.02 to about 6 parts by weight (exclusive of any carrier solvent such as dipropylene glycol or other non catalytic additive) per one hundred parts by weight of the total polyol reactant (p.p.h.p.) contained in the reaction mixture. Usually, the total amine concentration is from about 0.05 to about 4 p.p.h.p.

It is often desirable to include as a further component of the foam-forming reaction mixture a minor amount of an organic compound of tin. Such supplementary tin catalysts include any of the following: stannous salts of carboxylic acids such as stannous octoate, stannous oleate, stannous acetate and stannous laurate; dialkyltin dicarboxylates such as dibutyltin dilaurate, dibutyltin diacetate, dilauryltin diacetate, dibutyltin di(2-ethylhexanoate), dibutyltin maleate, dioctyltin diacetate, and the like; as well as dialkyltin oxides, trialkyltin oxides, tin mercaptides such as, for example, di-n-octyl tin mercaptide, and the like. Of these, the dialkyltin salts of carboxylic acids are especially suitable. When a tin compound is used as a co-catalyst, the concentration thereof is generally from about 0.001 up to about 2 parts by weight per 100 parts by weight of total polyol reactant contained in the high resilience foam formulation.

Foaming is accomplished by the presence in the foam formulation of varying amounts of a polyurethane blowing agent such as water which, upon reaction with isocyanate, generates carbon dioxide in situ, or through the use of blowing agents which are vaporized by the exotherm of the reaction, or by a combination of the two methods. These various methods are known in the art. Thus, in addition to or in place of water, other blowing agents which can be employed in providing high resilience foam as described herein include methylene chloride, liquefied gases which have boiling points below 80° F. and above −60° F., or other inert gases such as nitrogen, carbon dioxide added as such, methane, helium and argon. Suitable liquefied gases include aliphatic and cycloaliphatic fluorocarbons which vaporize at or below the temperature of the foaming mass. Such gases are at least partially fluorinated and may also be otherwise halogenated. Fluorocarbon agents suitable for use in foaming formulations of this invention include: trichloromonofluoromethane; dichlorodifluoromethane; dichloromonofluoromethane; 1,1-dichloro-1-fluoroethane, 1,2,2-trifluoro-1,1,2-trichloroethane; 1,1,1-trifluoro-2-fluoro-3,3-difluoro-4,4,4-trifluorobutane; hexafluorocyclobutene; octafluorocyclobutane; and the like.

The generally preferred method of foaming is the use of water as the sole source of blowing action or a combination of water plus a fluorocarbon blowing agent such as trichlorofluoromethane. When water is used as the sole or partial source of blowing action, generally no more than about 10 p.p.h.p. of water is introduced to the foam system, the more usual water concentration being from about one to about 4 p.p.h.p. High resilience foam is most usually all water blown. When a fluorocarbon blowing agent is used in conjunction with water, the fluorocarbon is usually used in a minor proportion such as up to about 10 weight percent of total blowing agent.

The relative amounts of the various components present in the foam-producing reaction mixture are not narrowly critical. The organic polyol reactant and polyisocyanate reactant are present in the foam-producing formulation in a major amount. The relative amounts of these two components is the amount required to produce the urethane structure of the foam and such relative amounts are well known in the art. The source of the blowing action such as water, auxiliary blowing agents, catalyst and the tertiary alcohol-modified siloxane surfactant foam stabilizer are each present in a minor amount necessary to achieve the function of the component. Thus, the blowing agent is present in a minor amount sufficient to foam the reaction mixture, the amine catalyst is present in a catalytic amount (i.e., an amount sufficient to catalyze the reaction to produce the urethane at a reasonable rate), and the tertiary alcohol-modified siloxanes used in this invention are present in a foam-stabilizing amount, that is, in an amount sufficient to stabilize the foam against voids and shrinkage so that the foam product is free from voids and shrinkage. Of course, it is understood that not every tertiary alcohol-modified siloxane surfactant employable herein and in every possible concentration may be suitable for every possible foam formulation. For instance, too high a concentration of the tertiary alcohol-modified siloxane surfactant can lead to foam shrinkage while too low a concentration can lead to voids in the foam product. However, the most preferred concentration of said surfactant for a given foam formulation can obviously be determined by routine experimentation as taught herein. The general preferred amounts of the various components present in the foam-producing reaction mixture have been given above.

If desired, other additional ingredients can be employed in minor amounts in producing high resiliency foam in accordance with the teachings of this invention. Illustrative of such additional components are inhibitors as exemplified by 2,6-di-tert-butyl-4-methylphenol ("Ionol"), added for the purpose of reducing any tendency of the foam to hydrolytic or oxidative instability. Flame retardants can also be used such as, for example, tris(2-chloroethyl)-phosphate, as well as other flame retardants such as those described in U.S. Pat. No. 3,846,462 (beginning with column 34, line 29, through column 35, line 34) the disclosure of which in this respect is incorporated as part of the present disclosure by reference thereto.

Other components which may be present in the high resilience foam formulations described herein are polyalkylsiloxane oils such as dimethylsiloxane oils. The latter may be added as such to the foam formulation or they may be introduced as components of the tertiary alcohol-modified siloxane surfactants. For example, the equilibrated polyalkysiloxane hydrides employed as hydrosilating agents in the preparation of the siloxanes of the invention may contain dimethylsiloxane species or such species may form during the preparation of the siloxanes of the invention by equilibration reactions as previously described herein. The high resilience foam formulations described herein may also contain the organo-silicones described in the aforementioned U.S. Pat. Nos. 3,741,917; 3,839,384 and 3,905,924 and Belgium Pat. No. 809,979. While the addition of such dimethylsiloxane oils or other organosilicones is not required, they may help expand the usefulness of the tertiary alcohol modified siloxanes described herein by increasing their adaptability to a variety of foam formulations.

Illustrative of further additives that can be present in the high resilience foam formulations employed in the practice of the invention are: cross-linking agents such as glycerol, diethanolamine, triethanolamine and their oxyalkylene adducts; additives to enhance load-bearing properties; carrier or solvent media for the amine catalyst (e,g, dipropylene glycol) and for the tertiary alcohol-modified siloxanes; as well as fillers, dyes, pigments, anti-yellowing agents, and the like.

The foam stabilizers comprising the tertiary alcohol-modified siloxane surfactants of this invention may be introduced to the high resilience formulations as a 100 percent active stream or they can be added in dilute form in suitable carrier and solvent media. For example, it may be desirable, particularly in commercial operation to employ the siloxane fluids of the invention in a diluted form, that is in the form of a siloxane fluid-solvent solution premix or a siloxane fluid-solvent-catalyst solution premix. Such solution premixtures can help serve to eliminate any mixing, metering, or settling problems. Moreover, fewer streams of ingredients may be needed at the mixing head of the operational apparatus. Of considerble importance is that the formulator has the latitude to select the particular solvent which best suits the system and minimize or eliminate any loss of foam properties. Siloxane fluid-solvent-catalyst premixes can also be used since the selected solvent can be one which serves the dual role of solvent for the catalysts as well as the siloxane fluid. This option of formulating a premix simplifies the foaming operation and improves the precision of metering ingredients. Illustrative of suitable types of diluents for the tertiary alcohol-modified siloxane surfactants use in this invention are: normally liquid aliphatic and aromatic unsubstituted and halogen-substituted hydrocarbons (e.g., heptane, xylene, toluene, chlorobenzenes, and the like); and normally liquid oxygen-containing compounds such as dialkylphthalates (e.g., dioctylphthalate), mono-ols, diols, triols and other polyols including the polyether polyols described above as Polyol I, as well as non ionic and anionic silicon-free organic surfactants, and any combination of such oxygen-containing liquid materials. When employed, the diluent selected is preferably one in which the tertiary alcohol-modified siloxane surfactant is substantially soluble. For example, it is preferred that at least five parts by weight of said siloxane surfactant be soluble in 95 parts by weight of diluent. More preferably, the minimum percentage of tertiary alcohol-modified siloxane in the siloxane fluid-solvent or siloxane fluid-solvent-catalyst solutions should be in the range of at least about ten to at least 30 weight percent. It is to be understood, of course, that such solvents need not be employed and that the maximum percentage of tertiary alcohol-modified siloxane in said solvent solutions is not critical. Moreover, when employed, such solvent solutions should of course be correlated to the amount of active tertiary alcohol-modified siloxane that may be employed per one hundred parts by weight of the organic polyol reactant as outlined above. The same correlation should also be made with regard to catalyst when a siloxane fluid-solvent-catalyst solution is employed. Preferably the solvent for the tertiary alcohol-modified siloxane is a hydroxyl-substituted organic compound such as hydroxyl-terminated organic ether compounds. More preferably they are polyether mono-ols or polyether polyols.

One class of suitable hydroxyl-substituted organic solvents for the tertiary alcohol-modified siloxanes of this invention are mixed ethylene oxide-propylene oxide adducts of butanol having the average formula, $C_4H_9(OC_3H_6)_m(OC_2H_4)_nOH$, where $n$ has an average value from about 3 to about 50 and $m$ has an average value from about 3 to about 40. Preferably, the values of $m$ and $n$ are such that the average molecular weight of these mono-ols is not substantially greater than about 2000 and the oxyethylene content is from about 20 to about 80 weight percent, based on total polyoxyalkylene content. Usually, the values of $m$ and $n$ are chosen such that the weight percent of oxyethylene is about the same as the weight percent of oxypropylene.

Another class of suitable solvents for the tertiary alcohol-modified siloxanes are organic surfactants which, when used, are usually of the non-ionic variety. Such non ionics include; the polyoxyethylene ethers of higher alcohols having from 10 to 18 carbon atoms including mixtures thereof; and polyoxyethylene ethers of alkyl-substituted phenols. Typical of such non ionic organic surfactants for use as the carrier medium for the siloxanes described herein are the ethylene oxide adducts of nonylphenol having the average composition, $C_9H_{19}-C_6H_4-(OC_2H_4)_t-OH$, wherein $t$ has an average value from about 4 to about 20, inclusive of whole and fractional numbers, such as 6, 9, 10.5 and 15.

The generally preferred solvents for the tertiary alcohol-modified siloxanes are: polyether triols such as glycerol-started poly(oxypropylene); and the class of polyether polyols having a primary hydroxyl content of at least about 35 mole percent, that is, the polyether polyols defined hereinabove as Polyol I.

The high resistance foam produced in accordance with the method of this invention can be produced by techniques known to the cellular urethane art. The preferred technique is the one-step or one-shot process wherein all of the formulation components are reacted simultaneously with the foaming operation. It is to be understood that the ingredients of the foam-forming formulation can be mixed in any suitable manner prior to commencing the cure reaction. Sometimes it is preferred to employ various premixes such as a premixture of the organic polyol reactant and tertiary alcohol-modified siloxane surfactant; a premixture of the organic polyol reactant, siloxane fluid stabilizer, blowing agent and catalyst; a premixture of the polyisocyanate and siloxane fluid stabilizer; a premixture of the siloxane fluid stabilizer, solvent and amine catalyst; and the like. Because of the high exothermic nature of the urethane-forming reaction, high resilience urethane foams are rapidly produced without the need to apply an external source of heat to obtain a satisfactory cure of the foam product whether slabstock or molded. Of course, if desired, the overall reaction can be even further accelerated by preheating the mold in the case of forming molded high resilience foam and/or by applying conventional high temperature post curing procedures. With or without post cure, however, high resilience foam formation achieves a greater degree of cure throughout the entire foam and shorter tack free and demolding times, then is generally achieved in forming conventional flexible polyether slab-stock and molded foam.

The polyurethanes produced in accordance with the teachings of this invention can be employed as a cushioning material such as for automobile seat cushions and furniture cushions, interior automotive padding, and furniture cushions, interior automotive padding, mattresses, as well as in carpeting and other end use applications associated with cellular polyurethanes generally.

The following examples illustrate the present invention and are not to be regarded as limitative. It is to be understood that all parts, percentages and proportions referred to herein and in the claims are by weight unless otherwise indicated. Moreover, as used herein in the formulas "Me" designates a methyl (—CH₃) radical.

EXAMPLE 1

In a 200 ml. three necked round bottom flask fitted with a mantle, magnetic stirrer, thermometer, condenser and nitrogen values, were combined 51.0 grams of a siloxane polymer having the average formula $$Me_3SiO(Me_2SiO)_{2.5}(Me(H)SiO)_{1.5}SiMe_3$$

and 16.8 grams (10% excess) of 3-hydroxy-3-methyl-1-butene, (H₂C=CHC(Me)₂OH). Heat was applied to 80° C. and several drops of chloroplatinic acid solution (4.0 wt. % in 1,2-dimethoxyethane) were added. The reaction exothermed to 135° C. in three minutes. Additional 3-hydroxy-3-methyl-1-butene (1.5 grams) was added to guarantee consumption of the silicon-bonded hydrogen, which was non-detectable shortly thereafter. The reaction was cooled, neutralized with 1 wt. % NaHCO₃, treated with small amounts of Hyflo Super-Cel filter aid and activated charcoal, and pressure filtered. The desired tertiary alcohol-modified siloxane product, a water-white fluid, had the average formula

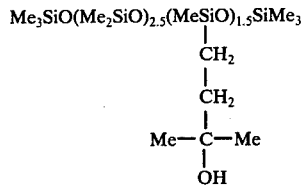

and is designated herein as Surfactant B. The siloxane product formula was confirmed by nuclear magnetic resonance spectroscopy.

EXAMPLE 2

In a manner similar to Example 1, the following tertiary alcohol-modified siloxane products designated herein as Surfactants A and C to F and having the following average formula were prepared. The product formulas were confirmed by nuclear magnetic resonance spectroscopy.

SURFACTANT A
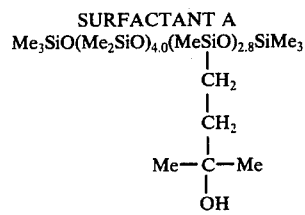

SURFACTANT C
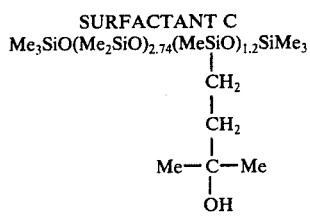

SURFACTANT D
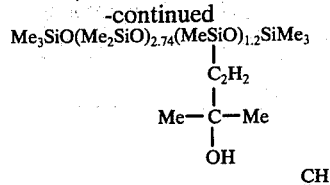

wherein C₂H₂ is —CH=CH— and =C<.

SURFACTANT E
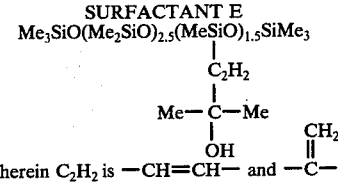

wherein C₂H₂ is —CH=CH— and =C<.

SURFACTANT F
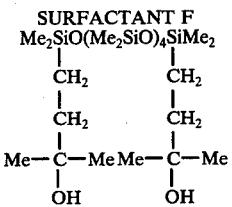

Surfactants A and C were prepared by reacting the corresponding trimethyl end-blocked dimethylsiloxymethylhydrogensiloxy siloxane starting materials with 3-hydroxy-3-methyl-1-butene. Surfactant F was prepared by reacting the corresponding (H)Me₂SiO(Me₂SiO)₄SiMe₂(H) starting siloxane with 3-hydroxy-3-methyl-1-butene. Surfactants D and E were prepared by reacting the corresponding trimethyl end-blocked dimethylsiloxy-methylhydrogensiloxy siloxane starting materials with 3-hydroxy-3-methyl-1-butyne, HC≡C—C(CH₃)₂OH which yields a mixture of two isomeric products, ≡SiCH=CHC(CH₃)₂OH (trans) and ≡SiC(=CH₂)C—(CH₃)₂OH.

EXAMPLES 3 to 9

In these Examples, respective high resilience polyether urethane forms were prepared employing tertiary alcohol-modified siloxane (Surfactants B to F) as the surfactant foam stabilizer component of a foam-producing reaction mixture which had the composition set forth in the following TABLE I.

TABLE I

| HIGH RESILIENCE FOAM FORMULATION | |
|---|---|
| Component | Parts by Weight |
| Polyol A: An ethylene oxide-capped, glycerol-started poly(oxypropylene) triol having a Hydroxyl No. of about 34, a molecular weight of about 5000, and a primary hydroxyl content of 70-75 mole percent. | 60 |
| Polyol B: A polymer/polyether polyol having a Hydroxyl No. of about 28 and based on (parts by weight): styrene (10) acrylonitrile (10) and Polyol (80) produced by polymerizing said monomers in Polyol A. | 40 |
| Polyisocyanate: A mixture of: (1) 80 weight percent of the 2,4-and 2,6-isomers of tolylene diisocyanate, the weight ratio of said isomers being 80:20, respectively; and (2) 20 weight percent of a polyphenylmethylene polyisocyanate containing about 2.6 t0 2.9 moles of -NCO per mole of polymer and having an average isocyanate content of about 31.4 weight percent. | 33.9 |

TABLE I-continued
HIGH RESILIENCE FOAM FORMULATION

| Component | Parts by Weight |
|---|---|
| Water | 2.6 |
| Dibutyltin dilaurate /1/ | 0.15 |
| Surfactant /2/ | Varied |
| Amine Catalyst System: | |
| Amine Catalyst: A 70 weight percent solution of Bis[2-N,N-dimethylamino)ethyl] ether in dipropylene glycol. | 0.1 |
| Amine Catalyst B: N-ethylmorpholine | 1.2 |
| Amine Catalyst C: Triethylenediamine | 0.12 |

/1/ A 10 percent solution in a polyether triol having a hydroxyl number of 56 and a molecular weight of about 3000.
/2/ The siloxane surfactants B to F were added to the formulations as a solvent solution in a glycerol-started poly(oxypropylene) triol having a Hydroxyl No. of about 56. The said solution contained 22 weight percent of Polymer A and 78 weight percent of said triol solvent and was used in amounts of either 0.35 and/or 0.75 parts by weight per 100 parts by weight of total Polyol and Polyol B contained in the formulation, as seen listed in TABLE II below.

The procedure employed in preparing the foams of these examples entailed the following manipulative steps: A blend of Polyols A and B was dispensed into a paper cup at about 20° to 30° C. Using a syringe, the solution of surfactant and the dibutyltin dilaurate were added to the polyol blend and dispersed therein with a spatula, followed by the addition of a premixture of the blowing agent (water) and amine catalysts which was also dispersed without using a baffle. The mixture was then placed under a drill press and agitated for ten secpnds at 2150 revolutions per minute with circular movement of the cup to ensure proper mixing. Without interruption of the mixing cycle, the polyisocyanate reactant was added rapidly and mixing continued for an additional seven seconds. The foam forming mixture was then rapidly poured into a box (8 × 8 × 6) supported by a wooden mold. The foam was allowed to rest in the supported container for at least two minutes after the apparent completion of foam rise to avoid densification at the bottom of the foam bun. While still in the box the foam was thereafter placed in an oven at 125° C. for ten minutes to reduce tackiness and to facilitate removal of the foam. The foam was allowed to stand at ambient temperature for about one hour before cutting samples for breathability measurement. Breathability was determined by a Gurley Densometer which measures the porosity or air resistance of the foam as shown by the time in seconds for a given volume of air (30 cc's of air) to pass into a standard area of foam. The value recorded is the average value of five such measurements given in seconds per 300 cc's of displaced air.

The properties of the foam products of Examples 3 to 9 are given in Table II which follows:

EXAMPLES 10 to 13

In these examples, respective high resilience polyether urethane foams were prepared employing tertiary alcohol-modified siloxanes (Surfactants A and B) as the surfactant foam stabilizer component of a foam-producing reaction mixture which had the composition set forth in the following TABLE III.

TABLE III
HIGH RESILIENCE FOAM FORMULATION

| Component | Parts by Weight |
|---|---|
| Polyol B /1/ | 50 |
| Polyol C: An ethylene oxide-capped, glycerol started Poly(oxypropylene) triol having a Hydroxyl No. of about 24, a molecular weight of about 6000, and a primary hydroxyl content of 85 mole percent. | 50 |
| Polyisocyanate /1/ | 34.1 |
| Water | 2.7 |
| Trichlorofluoromethane | 5.7 |
| Surfactant /3/ | Varied |
| Amine Catalyst System: | |
| Amine Catalyst A /1/ | 0.08 |
| Amine Catalyst B /1/ | 0.8 |
| Amine Catalyst C /1/ | 0.15 |

/1/ Same as defined in TABLE I
/2/ Blowing agent
/3/ The siloxane surfactants A and B were added to the formulation as a solvent solution in a glycerol-started poly(oxypropylene) triol having a Hydroxyl No. of about 56. The said solution contained 10 weight percent of Polymer A (same as defined in TABLE I) and 90 weight percent of said triol solvent and was used in amounts ranging from 0.3 to 1.12 parts by weight per 100 parts by weight of total Polyol B and Polyol C contained in the formulation The procedure employed in preparing the foams of these examples was the same described in Examples 3 to 9. The properties of Examples 10 to 13 are given in TABLE IV which follows:

TABLE IV

| Example | 10 | 11 | 12 | 13 |
|---|---|---|---|---|
| Siloxane Surfactant | A | B | B | B |
| Parts by Weight | 0.3 | 0.3 | 0.75 | 1.12 |
| Cells per Inch | 26 | 24 | 26 | 28 |
| Gurley Breathability | 17.3 | 9.8 | 16.7 | 21.2 |
| Top Shrinkage | Slight | None | None | Slight |
| Cell Fineness | Good | Good | Good | Good |
| Cell Uniformity | Good | Good | Good | Good |
| Voids | None | None | None | None |

The above data in TABLES II and IV demonstrate that the tertiary alcohol-modified siloxane surfactants are effective stabilizers against voids and shrinkage in the preparation of high resilience polyether urethane foam.

Various modifications and variations of this invention will be obvious to a worker skilled in the art and it is to be understood that such modifications and variations are to be included within the purview of this application and the spirit and scope of the appended claims.

What is claimed is:

TABLE II

| Example | 3 | 4 | 5 | 6 | 7 | 8 | 9 |
|---|---|---|---|---|---|---|---|
| Siloxane Surfactant | B | B | C | D | E | F | F |
| Parts by Weight | 0.75 | 0.35 | 0.75 | 0.75 | 0.75 | 0.75 | 0.3 |
| Cells per Inch | 32 | 25 | 28 | 28 | 26 | — | 24 |
| Gurley Breathability | 18.0 | 10.4 | 15.9 | 10.9 | 16.0 | — | 15.8 |
| Top Shrinkage | Slight | None | None | None | None | Severe | Slight |
| Cell Fineness | Good | Good | Good | Good | Good | — | Good |
| Cell Uniformity | Good | Good | Good | Good | Good | — | Good |
| Voids | None | None | None | None | None | — | None |

1. A process for producing high resilience polyether urethane foam, said process comprising foaming and reacting a mixture comprising:
   a. an organic polyether polyol having an average primary hydroxyl content of at least 35 mole percent and an average hydroxyl functionality from 2.1 to about 5;
   b. an organic polyisocyanate, said organic polyether polyol and said polyisocyanate being present in the mixture in a major amount and in a relative amount required to produce the urethane;
   c. a blowing agent in a minor amount sufficient to foam the reaction mixture;
   d. a catalytic amount of a tertiary amine catalyst for the production of the urethane; and
   e. a tertiary alcohol-modified siloxane surfactant in an amount sufficient to stabilize the foam against voids and shrinkage, said siloxane consisting essentially of (1) monofunctional end-blocking siloxy units, the respective silicon atoms of which have two alkyl radicals bonded thereto, the third silicon-bonded organic group being a tertiary alcohol radical, or an alkyl radical (2) an average of from about 1 to 6 moles of dialkylsiloxy units for every two moles of said monofunctional siloxy units, and (3) from zero up to an average of about 6 moles, for every two moles of said monofunctional siloxy units, of difunctional monoalkylsiloxy units in which the second organic group bonded to silicon is a tertiary alcohol radical; provided an average of at least about 0.5 moles of said tertiary alcohol groups are present in said tertiary alcohol-modified siloxane for every two moles of said monofunctional siloxy units, and wherein the silicon bonded alkyl radicals have from 1 to 4 carbon atoms and the silicon-bonded tertiary alcohol radicals have the formula

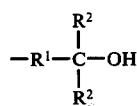

wherein $R_1$ is a bivalent hydrocarbon selected from the class consisting of alkylene radicals having from 2 to 8 carbon atoms and alkenylene radicals having from 2 to 8 carbon atoms, and $R^2$ is an alkyl radical having from 1 to 4 carbon atoms.

2. A process as defined in claim 1 wherein the tertiary alcohol-modified siloxane surfactant is selected from the class consisting of siloxanes having the average formula

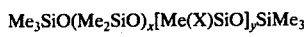

siloxanes having the average formula
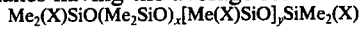

and siloxanes having the average formula
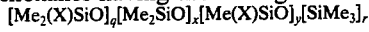

wherein Me is a methyl radical, $x$ has an average value of from about 1 to about 6, $y$ has an average value of from about 0 to about 6; and the average values of $q$ and $r$ being positive numbers the sum of which is 2, and X is a tertiary alcohol radical having the formula

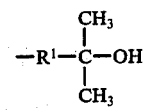

wherein $R^1$ is an alkylene radical selected from the group consisting of —CH₂CH₂—, —CH=CH— and

provided the total average number of tertiary alcohol (X) groups is at least about 0.5.

3. A process as defined in claim 2, wherein $R_1$ is —CH₂CH₂—.

4. A process as defined in claim 2 wherein the siloxane surfactant has the average formula

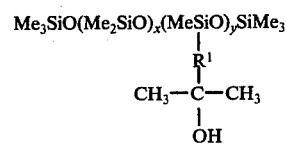

wherein $x$ has an average value of about 1 to about 4 and $y$ has an average value of about 1 to about 3.

5. A process as defined in claim 4 wherein $R_1$ is —CH₂CH₂—.

6. A process as defined in claim 5, wherein the siloxane surfactant has the average formula

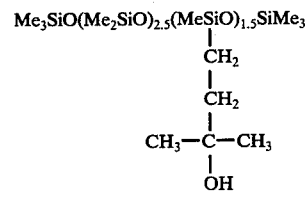

7. A process as defined in claim 2, wherein the organic polyether polyol is a polyether triol containing at least about 50 mole percent primary hydroxyl groups and having a molecular weight from about 2000 to about 8000.

8. A process as defined in claim 7 wherein the polyether triol contains about 60 to 90 mole percent primary hydroxy groups and has a molecular weight of about 4000 to about 7000.

9. A process as defined in claim 7 wherein the orgnaic polyether polyol reactant additionally comprises another polyether polyol having an average of at least two hydroxy groups, the polyether triol of said polyol reactant amounting to at least about 40 weight percent of said polyol reactant.

10. A process as defined in claim 7, wherein the organic polyether polyol reactant additionally comprises a polymer/polyether polyol produced by the in situ polymerization of at least one ethylenically unsaturated monomer in a polyether polyol.

11. A process as defined in claim 7, wherein the organic polyisocyanate reactant comprises a tolylene diisocyanate.

12. A process as defined in claim 7, in which the organic polyisocyanate is a polymeric aryl isocyanate having an average isocyanate functionality from about 2.25 to about 3.2.

13. A process as defined in claim 7 in which the organic polyisocyanate comprises tolylene diisocyanate residue obtained from the manufacture of the 2,4- and 2,6-isomers of tolylene diisocyanate.

14. A process as defined in claim 7 wherein the blowing agent comprises water.

15. A process as defined in claim 7 wherein the blowing agent comprises water and a halocarbon blowing agent.

16. A process as defined in claim 7 wherein the reaction mixture additionally contains a dialkyltin dicarboxylate.

17. A process as defined in claim 7, wherein the siloxane surfactant has the average formula

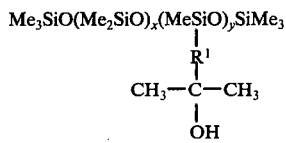

wherein Me is a methyl radical $R_1$ is selected from the group consisting of —CH$_2$CH$_2$—, —CH=CH— and

$x$ has an average value of about 1 to about 4 and $y$ has an average value of about 1 to about 3.

18. A process as defined in claim 17, wherein $R^1$ is —CH$_2$CH$_2$—.

19. A process as defined in claim 18, wherein the siloxane surfactant has the average formula

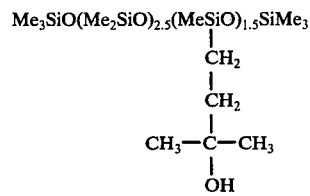

* * * * *

UNITED STATES PATENT OFFICE
CERTIFICATE OF CORRECTION

Patent No. 4,039,490   Dated August 2, 1977

Inventor(s)  Bernard Kanner

It is certified that error appears in the above-identified patent and that said Letters Patent are hereby corrected as shown below:

Column 1, line 66, "the" should be --and--.

Column 3, last line, the beginning of the formula shown as "$[R_2(x)$" should be --$[R_2(X)$--; while the ending of said formula shown as "$]_{y(I)}$" should read --$]_y$  (I)--.

In each instance in column 21, line 45 (claim 1); column 22, lines 16 (claim 3) and 30 (claim 5) and column 24 line 1 (claim 17) the symbol "$R_1$" should be --$R^1$--.

Signed and Sealed this

Fifth Day of June 1979

[SEAL]

Attest:

RUTH C. MASON
Attesting Officer

DONALD W. BANNER
Commissioner of Patents and Trademarks